United States Patent [19]

Vance

[11] Patent Number: 5,781,344

[45] Date of Patent: *Jul. 14, 1998

[54] LIGHT TRANSMITTING AND DISPERSING FILTER HAVING LOW REFLECTANCE

[75] Inventor: Dennis W. Vance, Paso Robles, Calif.

[73] Assignee: Jenmar Visual Systems, Sunnyvale, Calif.

[*] Notice: The term of this patent shall not extend beyond the expiration date of Pat. No. 5,563,738.

[21] Appl. No.: 729,803

[22] Filed: Oct. 8, 1996

Related U.S. Application Data

[63] Continuation of Ser. No. 117,250, Sep. 3, 1993, Pat. No. 5,563,738.

[51] Int. Cl.$^6$ .............................. G02B 27/00; G02B 21/60
[52] U.S. Cl. .............................. 359/614; 359/452; 359/613
[58] Field of Search .................. 359/443, 452–457, 359/601, 613, 615, 885–894, 900

[56] References Cited

U.S. PATENT DOCUMENTS 5,563,738  10/1996  Vance ............................ 359/614

*Primary Examiner*—Thong Nguyen
*Attorney, Agent, or Firm*—Fenwick & West LLP

[57] ABSTRACT

Multi-layer light filters provide optimized gain control, contrast, and ambient light rejection through the addition of optical layers to a basic refraction light filter. These additional layers allow adjustment of the gain, contrast, and ambient light rejection of light filters in a substantially independent manner, and can be combined to simultaneously optimize these optical properties.

29 Claims, 9 Drawing Sheets

LIGHT TRANSMITTING AND DISPERSING FILTER HAVING LOW REFLECTANCE

This is a continuation of application Ser. No. 08/117,250 filed on Sep. 3, 1993, now U.S. Pat. No. 5,563,738.

FIELD OF THE INVENTION

This invention relates to the field of light filters, and in particular to light filters for rear projection screens, display enhancement, and other optical uses requiring dispersive light control.

BACKGROUND OF THE INVENTION

Rear projection screens and light diffusers are light filters which provide an optically diffusing medium for transmitting light from an image source on one side of the screen to a viewer on the opposite side of the screen. A basic refractive light filter has been described in U.S. Pat. No. 2,378,252, which includes a refracting lens system as its principal component. The refracting lens system comprises an array of spherical glass or resin beads embedded in an opaque binder layer and mounted on a transparent support material. Typically, the light filter is oriented with the bead layer towards the image source and the transparent support material towards the viewers. U.S. Pat. No. 3,552,822 discloses a similar light filter which also includes an anti-reflection coating and has its bead layer oriented away from the image source.

The opaque binder layer serves a number of purposes, including affixing beads to the support material, reducing the reflectivity of the filter, and reducing the amount of light transmitted through the interstices between the beads of the lens system. Light from an image is refracted by the beads and dispersed to the viewer through a transmission area of the beads. This transmission area comprises the point of contact between the bead and support material and the area surrounding this point where the binder layer is too thin to absorb the refracted light.

Rear projection screens and light diffusers are characterized by their ambient light rejection, resolution, gain, and contrast, properties which are determined by the structure and composition of the component materials. For example, the gain which is a measure of the intensity of transmitted light as a function of the viewing angle, is determined by the index of refraction of the spherical beads and the surrounding medium. Similarly, the ambient light rejection and contrast of the light filter are determined largely by the opacity of the binder layer. The resolution of the screen is determined by the size of the beads used in the lens system.

However, the interdependence of certain optical properties and their dependence on the properties of component materials, limit optimization of the optical properties of basic refractive light filters. For example, if the opacity of the binder layer is increased to enhance the ambient light rejection of the viewing surface, transmission of refracted image light through the binder layer in the transmission area of the bead will be reduced. In addition, the range of indices of refraction of available materials also limits the performance of single layer filters. Such interdependencies and material limitations hamper the performance of basic refractive filters.

SUMMARY OF THE INVENTION

The present invention is a multi-layer light filter that provides high image transmission, high ambient light rejection, high contrast, and improved gain control. Multi-layer light filters in accordance with the present invention include glass or resin beads supported in an opaque layer and modified by additional optical layers. These layers provide means to vary the optical properties of the filter, and consequently allow improved image transmission, ambient light rejection, and gain control.

In accordance with the present invention, the gain control provided by the index of refraction of the beads is augmented by the addition of a transparent resin layer to the rear surface of the beads. The transparent resin layer provides additional gain control by replacing the air/bead interface with air/resin and resin/bead interfaces at which the refraction of image light can be separately adjusted. Refraction at the resin/bead interface is controlled by selecting the relative indices of refraction of the transparent resin layer and the beads. Refraction at the air/resin interface may be adjusted by selecting the thickness of the transparent resin layer in addition to its index of refraction, a thin layer of transparent resin being effective to alter the shape of the rear surface of the beads.

Light reflection and absorption properties are improved by the addition of an opaque resin layer to the back of the opaque binder layer, which allows the interstitial transmission of the multi-layer filter to be controlled without altering the opacity of the binder layer. Thus, the ambient light rejection, contrast, and control of interstitial transmission of the filter are enhanced without diminishing its image light transmission. By combining transparent and opaque optical layers, the optical properties of multi-layer light filters in accordance with the present invention can be simultaneously improved.

Multi-layer light filters in accordance with the present invention may be used for example as rear projection screens or as contact light diffusers. In the first case, near-collimated light is incident on the light filter from an image light source which is well separated from the multi-layer filter. In the latter case, the multi-layer filter is positioned on an image source such as a flat panel display, which is illuminated from behind with collimated light.

DETAILED DESCRIPTION OF THE INVENTION

Figure 1A:
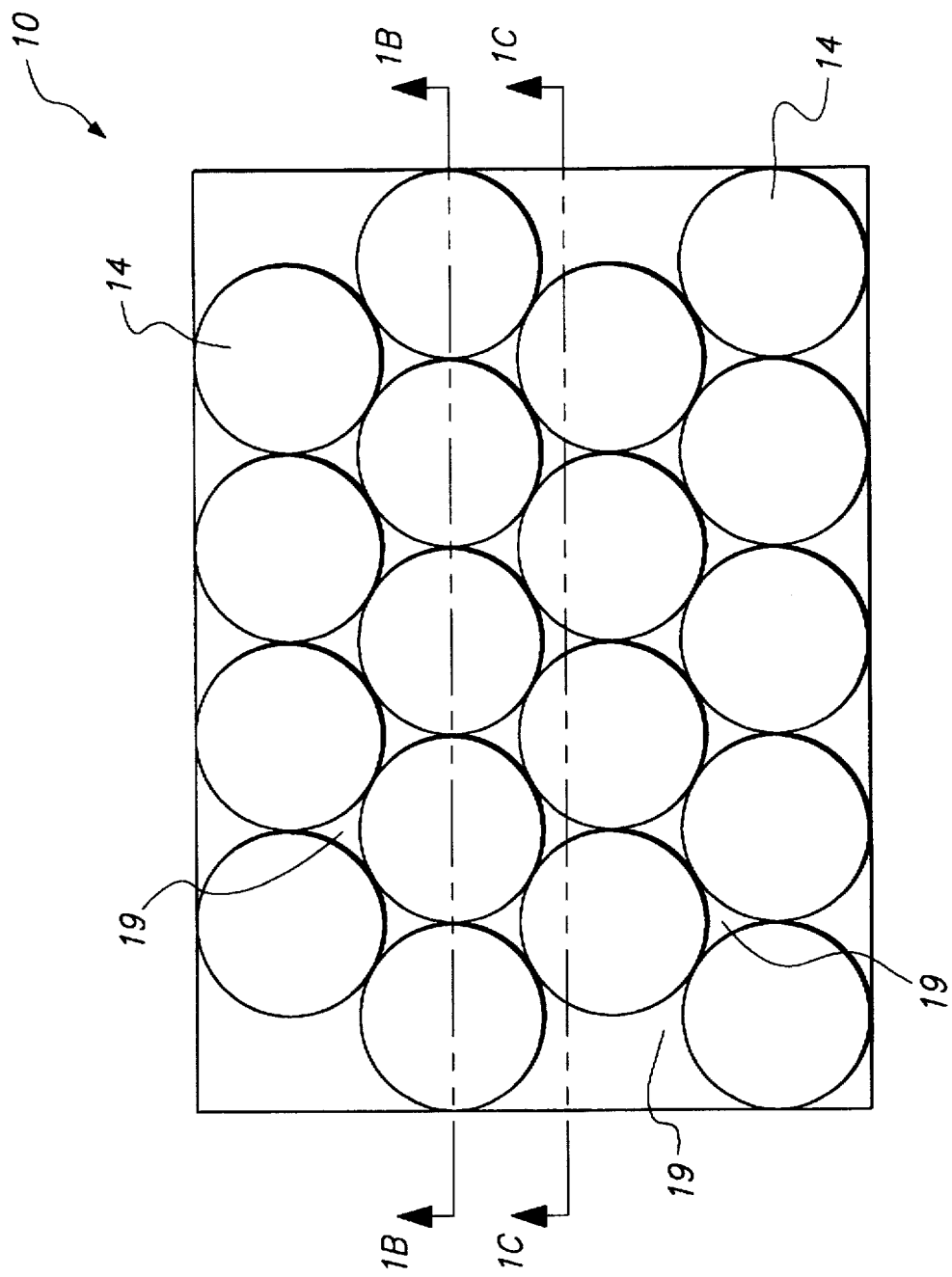
FIGS. 1A, 1B, 1C are schematic diagrams of a basic refractive rear projection screen, including cross sections taken at two different locations.
Figure 1C:
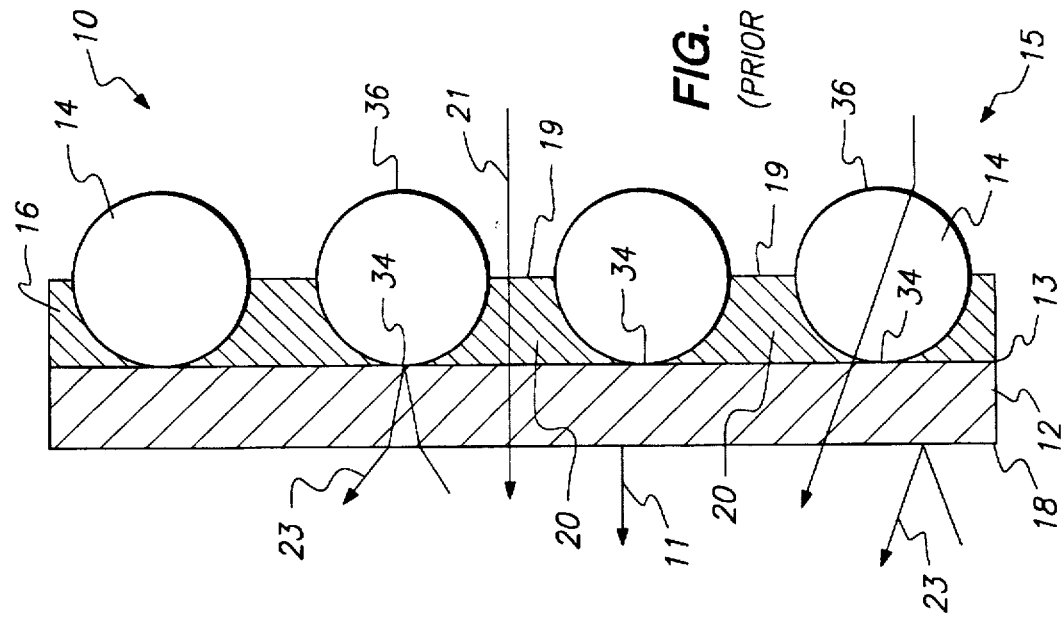
Figure 1B:
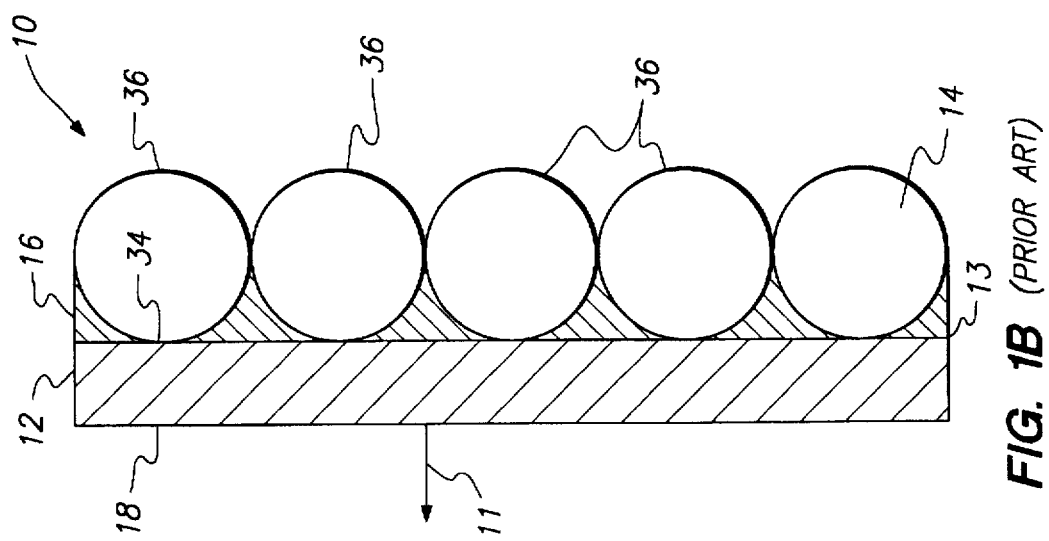

Referring to FIG. 1A, there is shown diagram of a conventional, basic refractive light filter 10. Referring to FIGS. 1B and 1C, there are shown cross sections of light filter 10 at the locations indicated in FIG. 1A. Basic refractive light filter 10 includes a transparent support material 12 which has a filter surface 18 and a support surface 13. Spherical glass or resin beads 14 are partially embedded in an opaque binder layer 16, which binds beads 14 to support surface 13.

Light from an image source is incident on filter 10 at back surfaces 36 of beads 14 and back surface 19 of opaque binder layer 16, which define a back or image side of light filter 10. Filter surface 18 defines a front side of light filter 10 through which viewers observer transmitted image light. Thus, light incident on beads 14 is refracted, transmitted through binder layer 16 at a transmission area 34, and dispersed to viewers through filter surface 18. Light incident on back surface 19 of binder layer 16 may reach viewers through interstices 20 between beads 14. One role of opaque binder layer 16 is to reduce transmission of this light.

Figure 2:
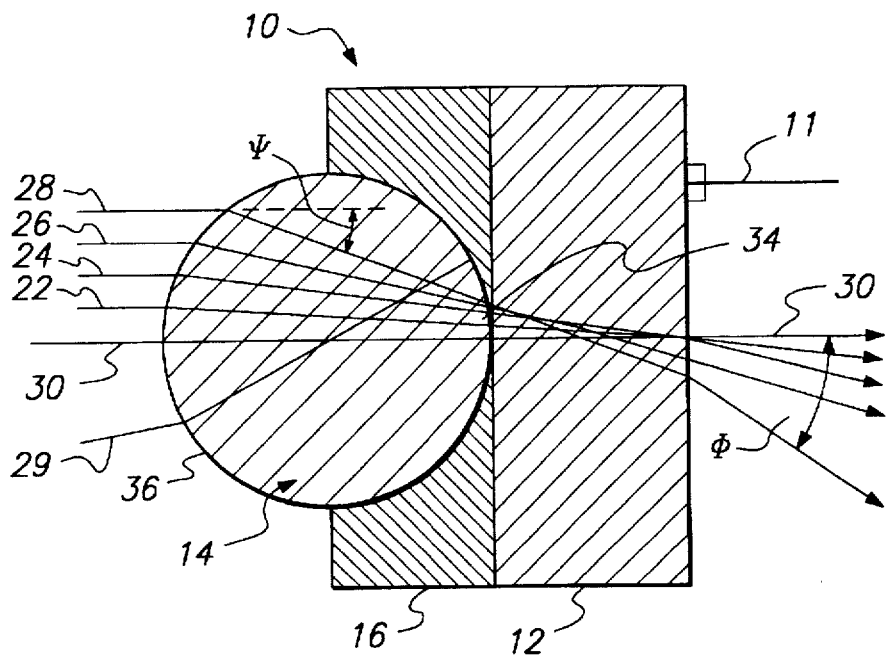
FIG. 2 is a diagram indicating the refraction of light rays by spherical beads in a basic refractive light filter.

Referring now to FIG. 2, there is shown a diagram of the paths followed by refracted light rays 22, 24, 26, 28 incident on back surface 36 of bead 14 at various distances from optic axis 30. Light rays 22-28 are refracted towards optic axis 30 by an angle Ψ that increases with the distance between point of incidence 31 and optic axis 30. Angle Ψ also increases with the index of refraction of beads 14. Refracted light rays 22, 24, 26, 28 are directed through transmission area 34, which includes the point of contact between bead 14 and support surface 13 as well as the surrounding area where intervening opaque binder layer 16 is too thin to absorb refracted light rays 22, 24, 26, 28. On the other hand, refracted ray 29 which strikes the front surface of bead 14 outside of transmission area 34 is absorbed as it transits opaque binder. layer 16.

Refracted rays 22, 24, 26, 28 diverge after passing through transmission area 34 of bead 14, dispersing transmitted light intensity over a range of angles φ. In light filters 10, the collective action of beads 14 disperses transmitted light intensity at various angles relative to a normal 11 of filter surface 18, and this intensity distribution is referred to as the gain profile. High gain light filters 10 transmit image light in a narrow angular distribution about normal 11, whereas low gain filters 10 transmit image light in broad distributions about normal 11. The optimum gain for light filter 10 will depend on its intended use, and is selected in part by choosing component beads 14 having an appropriate index of refraction.

Figure 3:
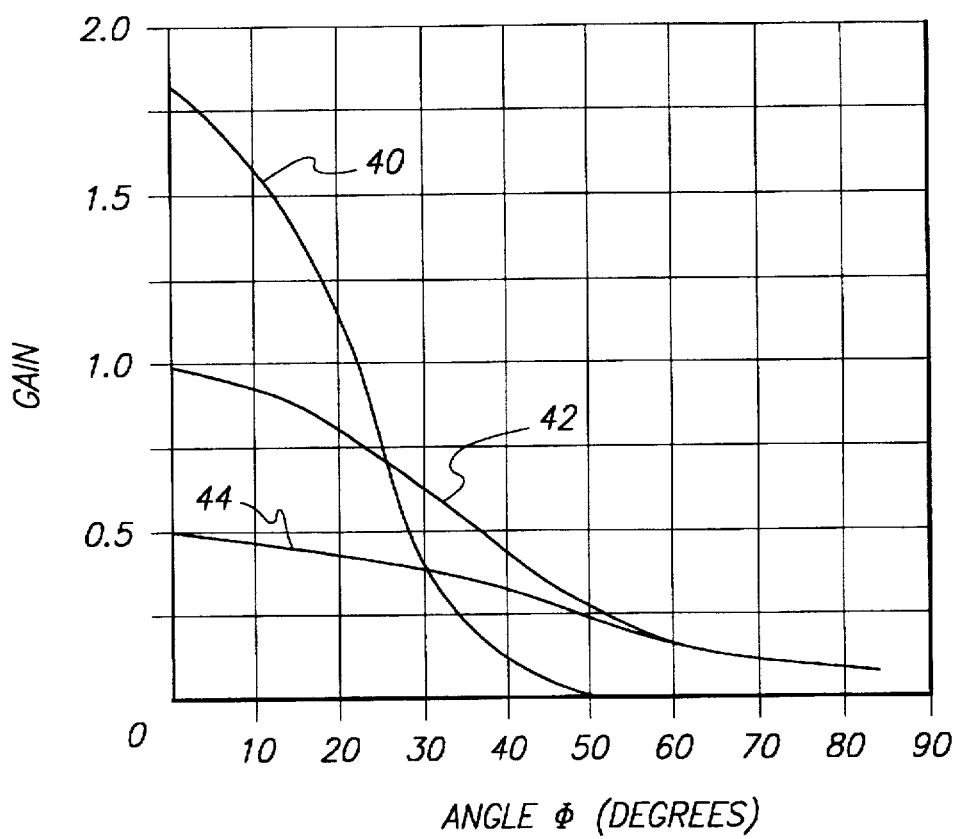
FIG. 3 is a graph of the gain profiles for three light filters having different indices of refraction in the glass beads.

Referring to FIG. 3, there are plotted gain profiles 40, 42, 44 for basic refractive light filters 10 comprising beads 14 having indices of refraction of 1.5, 1.7, and 1.9, respectively. The gain at 0° with respect to normal 11 is greatest for low index, beads 14 and decreases with increasing index of refraction. The greater refractive power of high index beads 14 refracts transmitted rays 22, 24, 26, 28 more sharply than low index materials, and they subsequently diverge over a wider range of angles from normal 11 and are less focused along normal 11.

In addition to gain, light filters 10 are characterized by their resolution, contrast, and ambient light rejection. It is generally desirable that filters 10 have both high resolution and high ambient light rejection. The resolution of light filters 10 is determined by the size of beads 14, since the packing density of beads 14 on support surface 13 determines the density of transmission areas 34 on this surface. This property can generally be maximized by constructing filters 10 using the smallest diameter beads 14 available. The size of beads 14 selected may be dictated by variations in the quality and properties of available beads 14.

Ambient light rejection measures how well ambient light incident on the front of a light filter 10 is absorbed or transmitted relative to the amount re-dispersed back to the viewer. This property depends primarily on the opacity of binder layer 16 and the index of refraction of beads 14. Ambient light reflected into viewers' eyes from filter 10 can significantly impair the quality of an image by washing out the contrast.

In basic refractive filter 10, ambient light incident on filter surface 18 may be reflected at the interfaces between: opaque binder layer 16 and support surface 13, beads 14 and opaque binder layer 16, and beads 14 and air at back surface 36. Of these, the last is typically most important since the indices of refraction of support material 12, opaque binder layer 16, and beads 14 can be made approximately equal, minimizing reflection from the first two interfaces.

It is not a simple matter to maximize ambient light rejection in basic refractive light filters 10 without compromising other optical properties, since the opacity of binder layer 16 affects these other properties. For example, increasing the opacity of binder layer 16 to improve ambient light rejection decreases the amount of image light transmitted through beads 14 in the zone around the point of contact between beads 14 and support material 12, i.e. transmission areas 34.

Specular, non-dispersive reflection from filter surface 18 is also present in all filters 10, and is typically minimized by means of anti-reflection and anti-glare coatings and treatments. While these coatings and treatments are not within the scope of the present invention, they may be applied concurrently to enhance the overall performance of the present invention.

Figure 4:
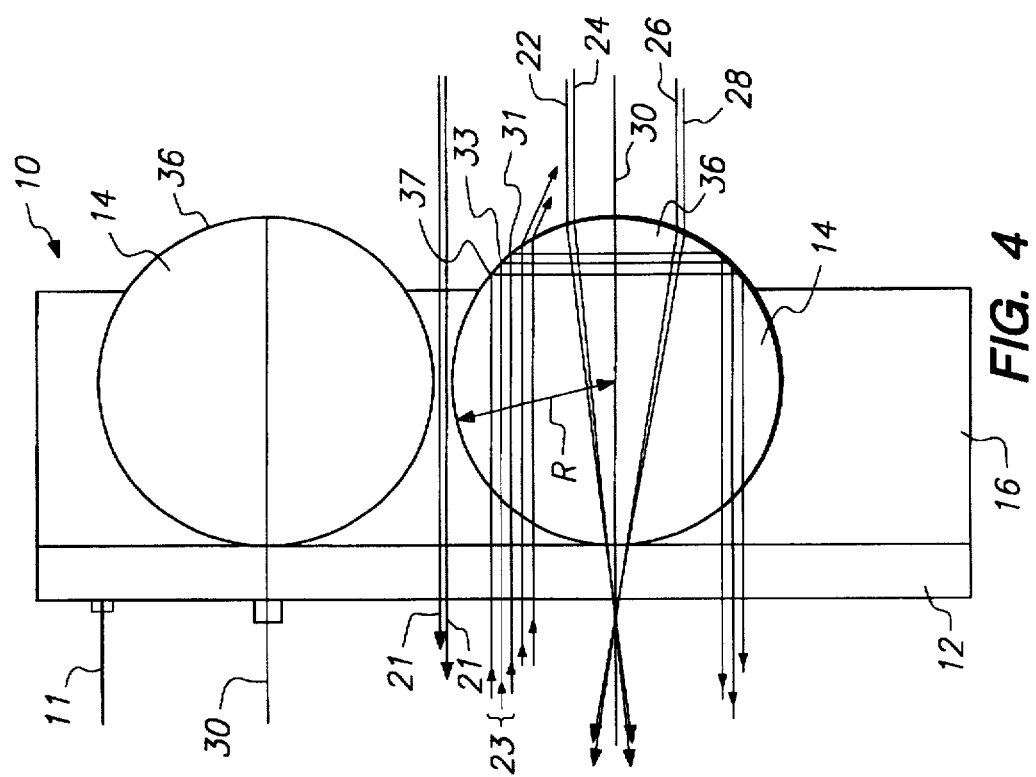
FIG. 4 is a schematic diagram of ambient light rays refracted and retro-reflected by the rear surface of beads.

Referring now to FIG. 4 there are shown ambient light rays 23 passing through support material 12 and incident on rear surface 36 of a spherical bead 14 having an index of refraction of 1.5. Light rays 23 substantially parallel to optic axis 30 and incident on rear surface 36 of bead 14 at points 31, 33, 37, undergo total internal reflection for points 31, 33, 37 more than approximately 0.7 R from optic axis 30, where R is the radius of bead 14. Thus, approximately 50% of the ambient light striking rear surface 36 of bead 14 will be retro-reflected. Retro-reflected rays 23 which are not absorbed by opaque binder layer 16 exit filter 10 along with transmitted image light 22, 24, 26, 28, and thereby diminish the quality of the image.

In addition, image light transmitted through interstices 20 between beads 14 also reduces the quality of an image. Light rays 21 following this trajectory are not refracted by beads 14 and interfere with the gain profile of properly refracted light rays 22, 24, 26, 28.

For basic refractive light filters 10, the intensity of light rays 21 transmitted through interstices 20 and those retro-reflected from beads 14 are controlled by the opacity of binder layer 16. Retro-reflected rays 23 pass through approximately twice as much binder layer 16 as transmitted rays 21, and are consequently absorbed at lower opacities than transmitted rays 21. However, increasing the opacity of binder layer 16 to reduce transmitted rays 21, reduces transmission of image light through transmission area 34 as discussed above. Thus, compromises between maximizing transmitted light and minimizing retro-reflected and interstitially transmitted light, limit optimization of basic refractive filters 10.

In addition to these limitations, the degree of gain control in basic refractive light filters 10 is also constrained. For instance, reducing the index of refraction of beads 14 to create higher gain at 0° necessarily reduces the refracting power of beads 14. As a result, the amount of light focused into transmission area 34 and subsequently transmitted to filter surface 18 is reduced, reducing the intensity of transmitted image light. The degree of gain control available through varying the index of refraction of beads 14 may also be limited by the physical properties of existing materials. Flattening beads 14 to increase the radius of curvature of the back surfaces 36 provides an alternative means for increasing the gain of basic refractive light filters 10. However, where this flattening is achieved by simply compressing deformable resin beads 14 parallel to optic axis 30, the distance between individual beads 14 increases, resulting in a lower density of beads 14 and lower resolution.

The present invention optimizes both the gain and ambient light rejection of light filters 10 through the addition of layers of material having selected optical properties and the substitution of new materials for the structures of light filters 10. Thus, new light filters 50, 70, 80, 90 as discussed in conjunction with FIGS. 5, 6, 8 and 10 are produced by adding new layers 62, 72, 82 of optical materials to basic light filter 10, which is constructed with glass or resin support materials 12, binder layers 16, and beads 14 selected to optimize the desired optical properties. Since filters 50, 70, 80, 90 are based on light filter 10, the components of light filter 10 and their combinations are discussed first.

With regard to material selection, the optical and mechanical properties of support material 12 contribute to the characteristics of filters 50, 70, 80, 90 in a variety of ways. For example, the index of refraction of support material 12 affects the angular distribution of transmitted light through refraction, and the contrast through its influence on internal reflection. In addition, absorbing materials can be included in support materials 12 to reduce back reflectance and lateral internal reflectance. For example, use of photochromic glass for support material 12 automatically increases the absorption and decreases the reflectance of support material 12 in bright ambient light conditions. Alternatively, the use of electrically active optical material for support material 12 allows the optical properties to be varied dynamically. These effects can be used in conjunction with the optical properties of beads 14, binder layer 16, and layers 62, 72, 82 to fine tune the performance of filters 50, 70, 80, 90.

The mechanical properties of support material 12 can also be selected according to the use to which filters 50, 70, 80, 90 are put. For example, plastic support materials 12 reduce the weight and flexible materials such as plastic films can be used to produce flexible filters 50, 70, 80, 90. By including a release agent on support surface 13, support material 12 can be removed to provide flat or shaped free standing light filters 50, 70, 80, 90.

Binder layers 16 may be made from a variety of matrix materials. For example, butyl methacrylate polymers readily mix with colorants and their thermoplastic properties provide a simple means for embedding beads 14. Generally, UV, thermal, and chemically cured resins may be used to produce binder layer 16. These materials may be applied in several layers 16 each having different optical densities. Alternatively, binder layer 16 may be a photosensitive film, in which case its optical density can be varied with depth by exposure to actinic light. Photochromic materials on the other hand provide a binder layer 16 that automatically adjusts its absorption in response to ambient light conditions. In addition to film and resin type materials, binder layer 16 may be a wire mesh or perforated metal sheet as is discussed in conjunction with FIG. 5B, or a combination of mesh and clear resin materials.

For resin based binder layers 16, beads 14 may be embedded in a close-packed array using a number of processes. In one method, support material 12 is coated with a thermoplastic resin binder layer 16 which is modified by a colorant to adjust the binder layer 16 to the desired opacity. Beads 14 are then spread over the thermoplastic resin binder layer 16 which is subsequently heated, allowing beads 14 to be pressed into resin binder layer 16 until they contact support surface 13. Beads 14 may also be deposited by electrophoresis from a fluid medium, by spraying a mixture of beads 14, material for binder layer 16, and a solvent onto support material 12, or by spraying beads 14 directly onto a softened binder layer 16.

Close packing of beads 14 may be enhanced by applying electrostatic charges to beads 14 and/or binder layer 16 or support material 12 to position beads 14. Alternatively, beads 14 may be pre-positioned on a surface shaped to enforce close packing, and subsequently transferred to binder layer 16. Electrostatic assisted transfer as in xerography may also be used to transfer and position beads 14 onto binder layer 16.

Beads 14 may be selected from a variety of glass or resin materials, the optimal material and size of beads 14 may depend on the intended application of light filter 50, 70, 80, 90. Transparent glass or resin materials are available with indices of refraction of between about 1.4 and 2.1, and combinations of materials may be used to provide additional gain control. For example, beads 14 formed by encapsulating electro-optically active materials in glass or resin allow for the adjustment of the optical properties of beads 14 by application of an electric field. Beads 14 may also be composed of photochromic material to allow their optical properties to respond to changes in incident light intensity. Alternatively, colored beads 14 may be used to allow chromatic effects.

Light filters 50, 70, 80, 90 can be constructed with beads 14 of any diameter. In practice, the diameter is selected according to the desired resolution. However, beads 14 of differing diameter may be combined in the same light filter 50, 70, 80, 90. For example, smaller diameter beads 14 may be added to the interstices 20 of an array of larger diameter beads 14 to increase the packing density as illustrated in light filter 150 of FIG. 5C. Beads 14 which can be permanently or temporarily deformed may also be used to provide an additional gain control mechanism.

Careful selection is necessary to eliminate out-of-round, wrong-sized, and discolored beads 14. Out-of-round beads 14 cause uneven refraction of light, which creates bright spots and graininess in the viewed images in filters 50, 70, 80, 90. The inclusion of opaque or frosted beads 14 creates dark spots in filters 50, 70, 80, 90 and reduces transmission efficiency.

Preliminary sorting of beads 14 can be done using fine screens or meshes. Discolored beads are often ferromagnetic, and can be separated in a magnetic field. Out-of-round beads 14 can be separated by rolling them down a vibrating plane or allowing them to settle through a vibrating column, relying on the faster passage of round beads.

In certain instances, it may be useful to use beads 14 having non-spherical shapes such as ellipsoids or rounded rods. Such non-spherical beads can be deposited in alignments that provide different optical properties in different directions.

Figure 5A:
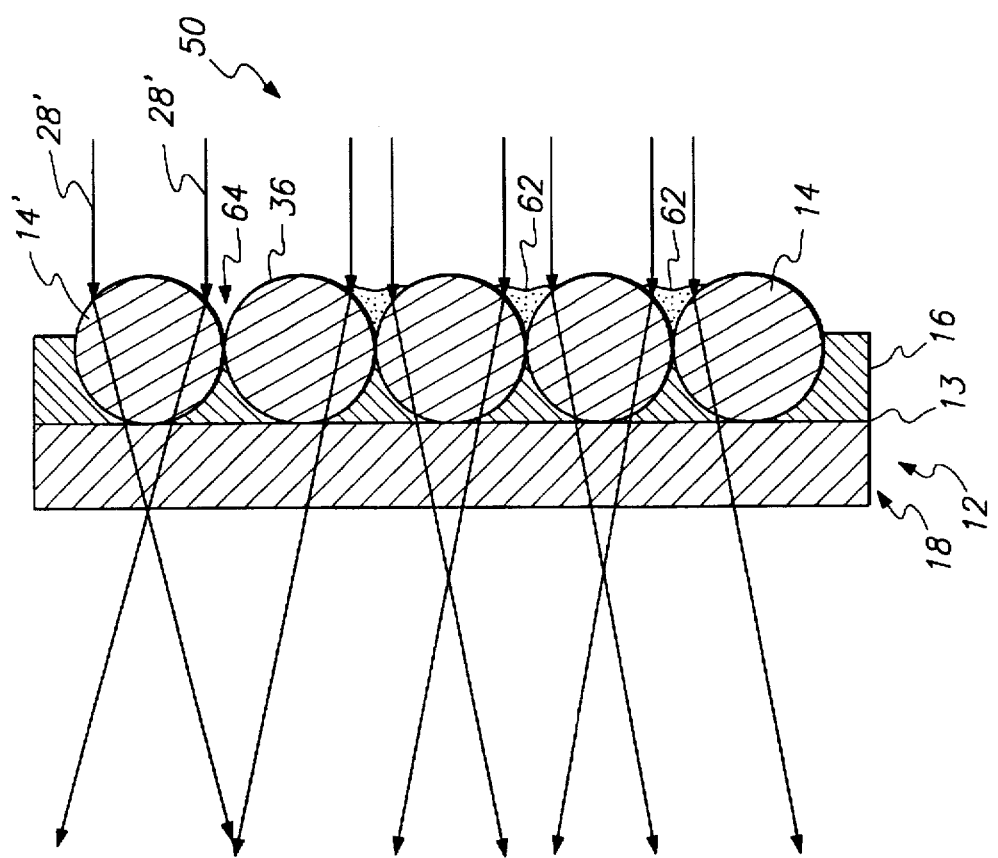
FIGS. 5A, 5B are schematic diagrams of light filters in accordance with the present invention in which the interstices between beads at the rear of the filters have been partially filled with transparent resin to control their gain.

Once the basic light filter 10 has been generated in the manner described above, it is modified as described below to enhance the targeted optical properties. Referring now to FIG. 5A, there is shown a light filter 50 in accordance with the present invention, which provides additional gain control beyond that provided by the index of refraction of component beads 14. Light filter 50 comprises a transparent support medium 12, having a support surface 13 and a filter surface 18, and an opaque binder layer 16 in which spherical beads 14 having a selected index of refraction are embedded. In addition, a thin layer 62 of transparent resin is deposited in depressions 64 created by back surfaces 36 of beads 14 protruding from back surface 19 of binder layer 16. The index of refraction of resin layer 62 may be greater, less than, or substantially equal to that of beads 14, depending on the desired gain of filter 50.

Resin layer 62 increases the effective radius of curvature of back surfaces 36 of beads 14, thus reducing their refractive power. For comparison, refracted rays 28' for untreated beads 14' are shown at the top of FIG. 5A. The actual refractive power of beads 14 will vary with the degree to which depressions 64 are filled. This dependence provides a means to adjust the gain of light filter 50 in addition to changing the index of refraction of beads 14.

As the depth of resin layer 62 in depressions 64 is increased, the effective radius of curvature of back surfaces 36 of beads 14 approaches infinity, i.e. a planar surface. In this limit, depressions 64 are completely filled with resin layer 62, and as long as resin layer 62 has the same index of refraction as beads 14, light rays incident normal to the resulting plane surface will not be refracted. Where resin layer 62 and beads 14 have different indices of refraction, however, refraction will occur at back surface 36 of beads 14, providing another means for controlling the gain of multi-layer light filter 50 beyond varying the index of refraction of beads 14.

Figure 5B:
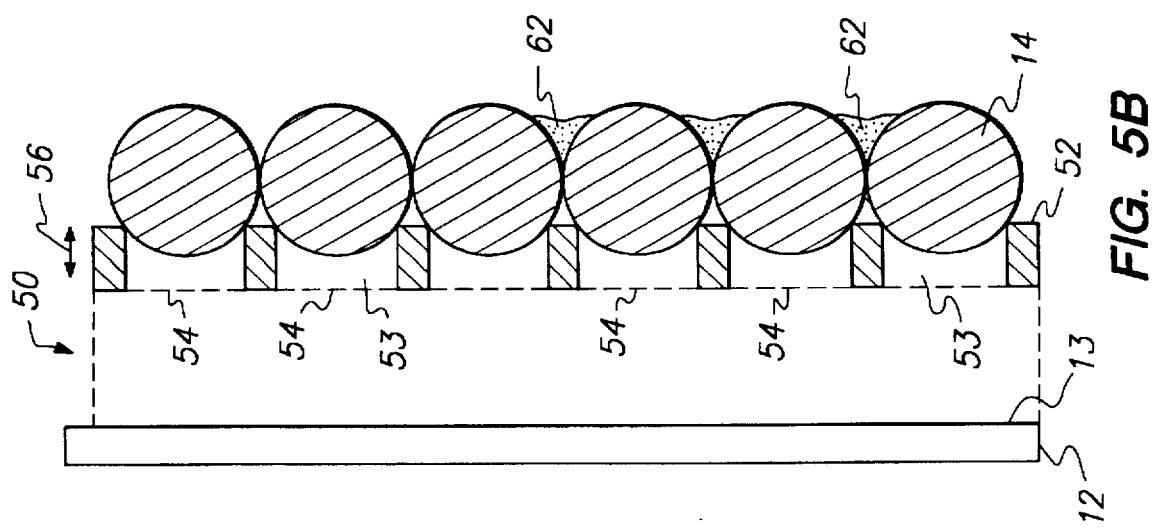
Figure 5C:
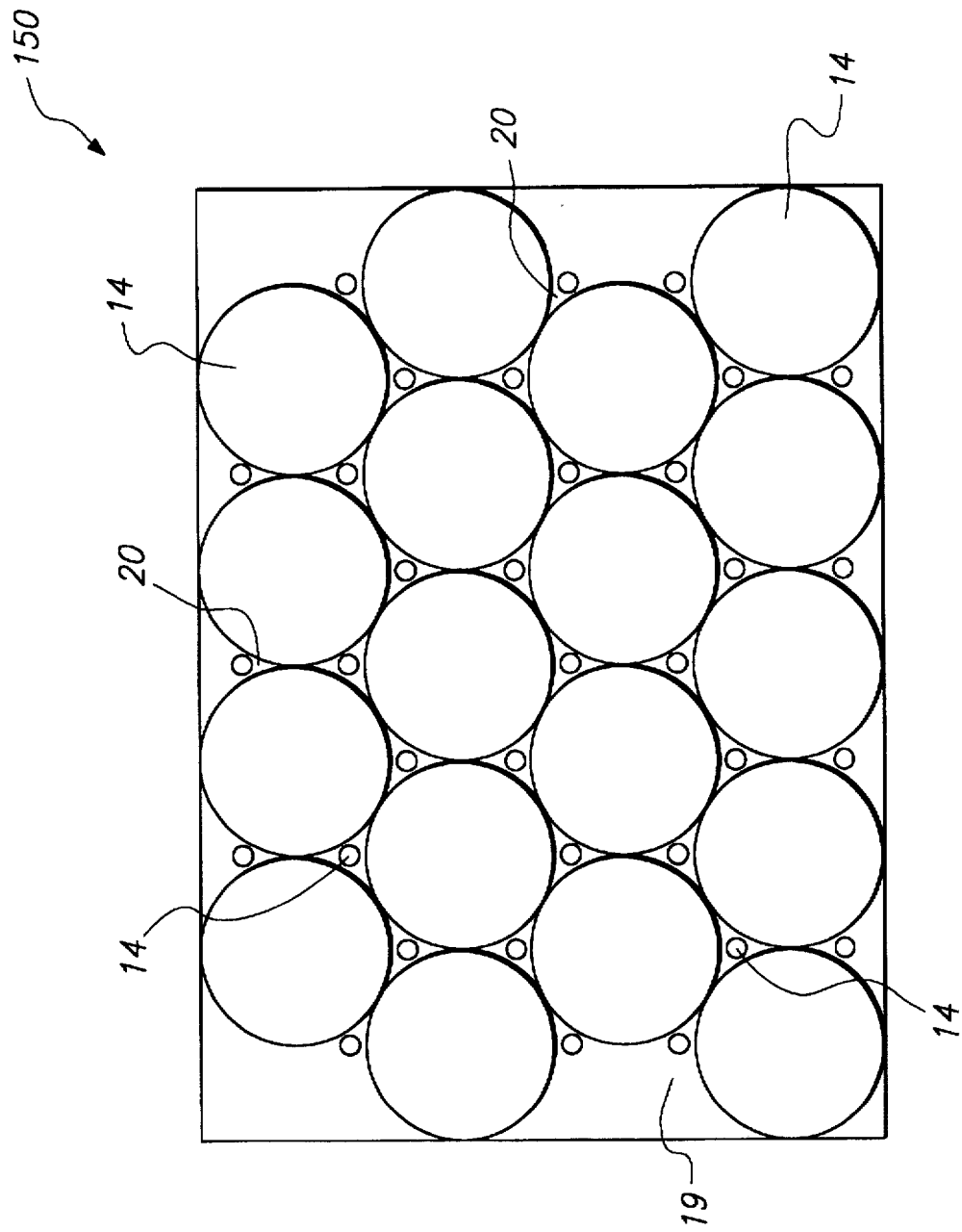
FIG. 5C is a schematic diagram of a light filter in accordance with the present invention in which the interstices between larger beads of the light filter include a plurality of smaller beads for increasing the packing density of beads in the light filter.

Referring now to FIG. 5B, there is shown a light filter 50 in which opaque binder layer 16 is an opaque metal or plastic substrate 52 having a grid of perforations 54 in which beads 14 are supported. Perforations 54 are sized to accommodate beads 14 to a pre-selected depth 56, and the grid of perforations 54 is chosen to provide close packing of beads 14 or alignment of beads 14 in a preferred manner. The latter situation may arise for example where the source of image light is a digital video display, in which case it may be desirable to align beads 14 with the pixels of the video display.

As indicated in FIG. 5B, light filter 50 may be assembled with or without support material 12. A flexible light filter 50 is provided by using a flexible opaque substrate 52 such as a plastic mesh or net, and either omitting support material 12 or using a flexible support material 12. As noted above, a clear or colored resin layer may be combined with opaque substrate 52 to form binder layer 16. A resin layer 62 may be included to increase the effective radius of curvature of rear surface 36 of beads 14. In general, light filters 50, 70, 80, 90 realized using an opaque resin for binder layer 16 may also be implemented using opaque substrate 52 or a combination of resin and substrate 52 for the same purpose.

Where support material 12 is present, support surface 13, bead 14, and substrate 52 create a cavity 53 which may be filled with liquid or gases having optical properties chosen to alter the characteristics of filter 50. Liquid or gas materials in cavities 53 extend the range of optical properties beyond what is available in solid materials. These properties can be altered by temperature, pressure, or radiation, adding another parameter to control the optical properties of filter 50.

Figure 6A:
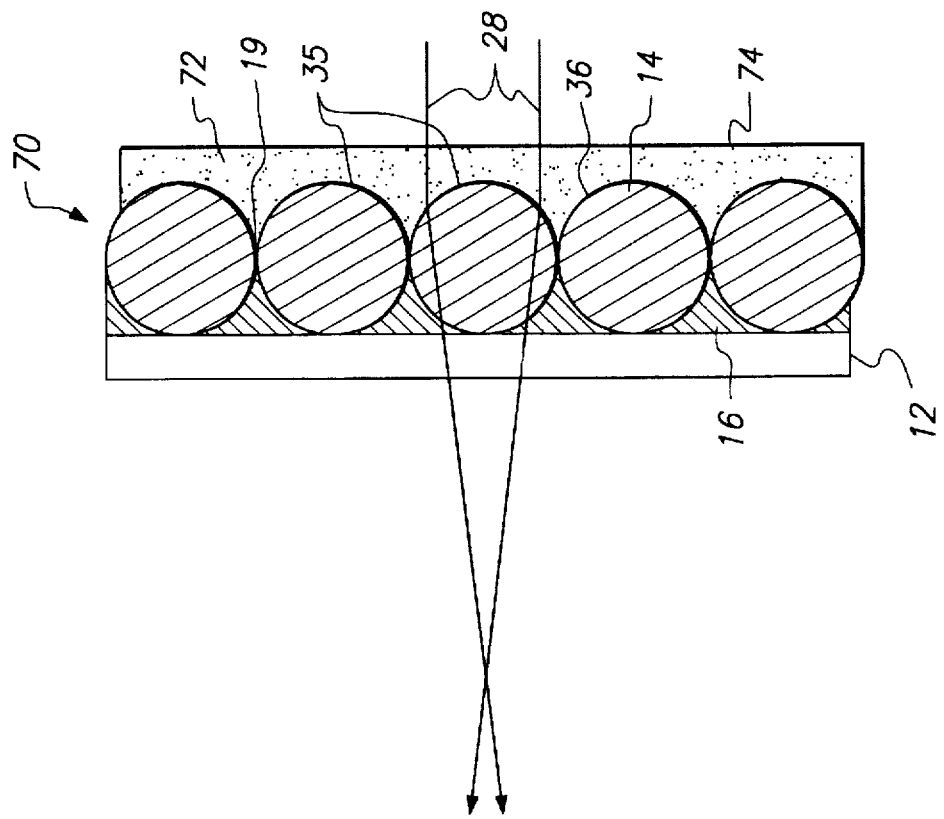
FIGS. 6A, 6B are schematic diagrams of light filters in accordance with the present invention in which a transparent resin layer having an index of refraction different from that of the spherical lenses has been added to the rear surfaces of the beads to control their gain.

Referring now to FIG. 6A, there is shown a light filter 70 having gain control in addition to that provided by the index of refraction of beads 14. Light filter 70 has an array of beads 14 embedded in an opaque binder layer 16 which is affixed to support material 12. In addition, a layer of clear resin 72 having an index of refraction different from that of beads 14 is added to rear surface 36 of beads 14 and rear surface 19 of binder layer 16. Unlike layer 62 of light filters 50, however, resin layer 72 is sufficiently thick to fully enclose beads 14 and present a planar surface 74 to incident image light. As indicated, light rays 28 from an image source are incident normally on planar surface 74 where they undergo no refraction. However, at interface 35 between resin layer 72 and beads 14, light rays 28 are refracted by an amount determined by the difference between indices of refraction of these media. Thus, refraction at interface 35 and consequently the gain of light filter 70 can be adjusted by varying the index of refraction of resin layer 72 as well as that of beads 14.

Ray 28 is drawn for the case where beads 14, binder layer 16, and support material 12 have substantially equal indices of refraction. As noted earlier, independent adjustment of the indices of binder layer 16 and support material 12 provide additional control over the gain of filter 70.

Figure 6B:
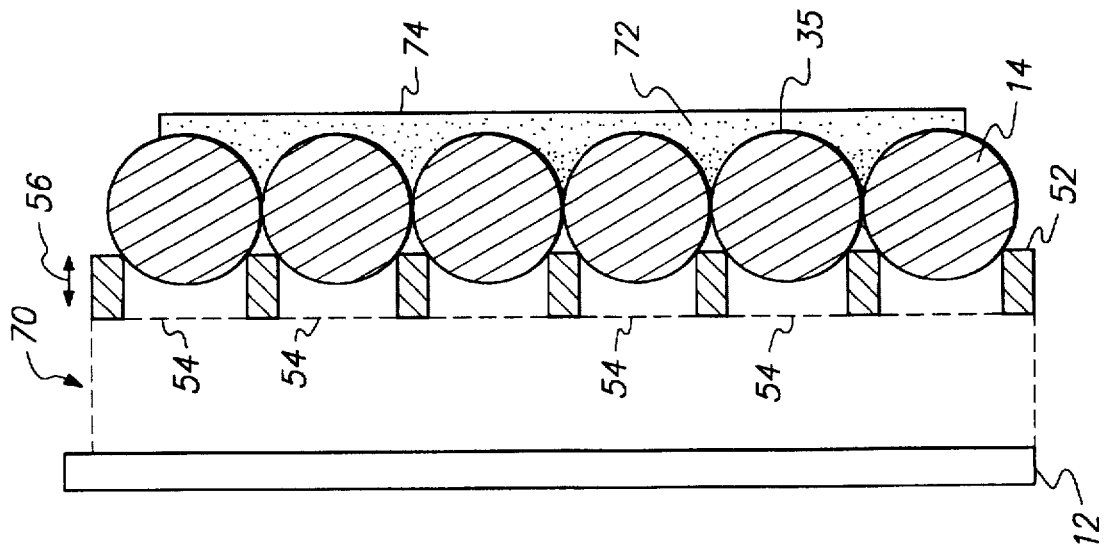

Referring to FIG. 6B, there is shown a light filter 70 in which opaque binder layer 16 is a perforated opaque substrate 52. The remaining features of light filter 70 are identical to those shown in FIG. 6A.

Figure 7:
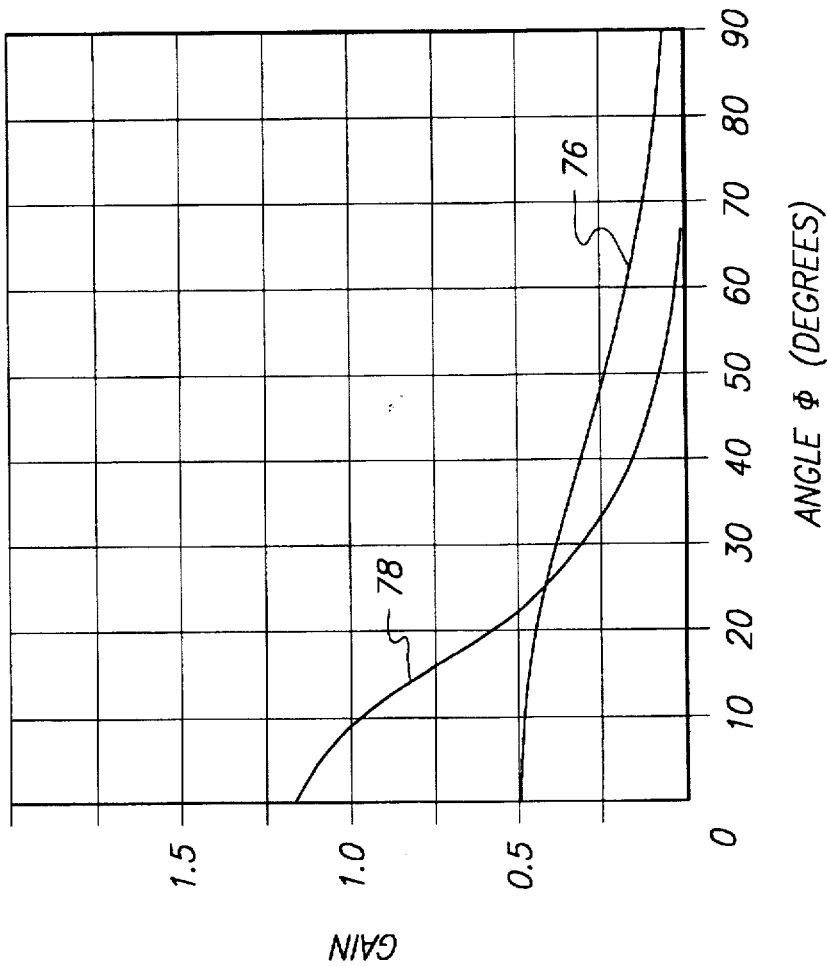
FIG. 7 is a graph of the gain profile versus angle from the normal to the viewing surface for a basic refractive light filter and for a light filter having an additional resin layer in accordance with the present invention.

Referring now to FIG. 7, there are shown gain profiles 76, 78 for basic refractive light filter 10 and for two-layer light filter 70, respectively, where each comprises beads 14 having indices of refraction of about 1.9. Transparent resin layer 72 of light filter 70 has an index of refraction that is approximately 1.5. Due to the weaker refraction at the interface 35 between rear surface 36 of beads 14 and resin layer 72, light rays 22, 24, 26, 28 are transmitted more nearly parallel to optic axis 30, giving light filter 70 a higher gain (78) than light filter 10. The gain control is comparable to that provided by thin resin layer 62 of light filter 70. Thus, the additional layers 62, 72 provide more complete control of the gain of light filters 50, 70, respectively, than is possible with basic refractive light filters 10. This is due to the fact that the gain of light filters 70 of FIGS. 6A and 6B can be controlled by adjusting the effective radius of back surface 36 of beads 14, the index of refraction of beads 14, and indices of refraction of second layer materials 62, 72 respectively in any desired combination. Further, this additional control is achieved without adversely affecting the other optical properties of light filters 70.

Figure 8:
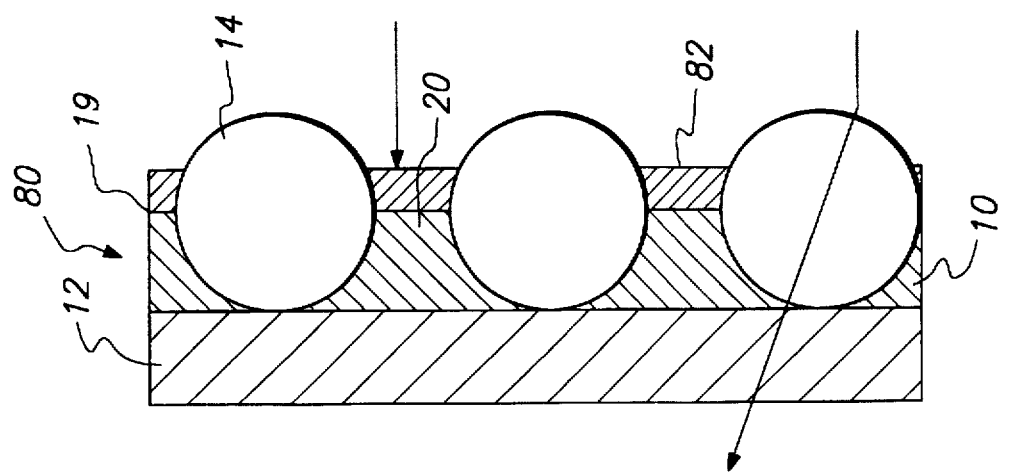
FIG. 8 is a cross section of a light filter in accordance with the present invention in which a second opaque layer has been added to the filter to enhance its ambient light rejection and image contrast.

Multi-layer light filters in accordance with the present invention may also include optical layers which enhance the contrast and ambient light rejection provided by the opacity of binder layer 16. Referring now to FIG. 8, there is shown a light filter 80 in accordance with the present invention. In addition to support material 12, refracting beads 14, and binder layer 16, light filter 80 includes a second opaque layer 82 which is deposited on back surface 19 of binder layer 16. The opacity of layer 82 is selected to reduce the transmission of light through interstices 20 to an acceptable level. The opacity of binder layer 16 is independently selected to reduce reflected light 23 to acceptable levels, without reducing transmission of image light through area 34. With the multi-layer structure of light filter 80, transmission through area 34 is not affected by the greater opacity of layer 82, so the opacity of layer 82 can be increased to the eliminate light transmission through interstices 20.

One way to generate opaque layer 82 is to deposit carbon black or some other powdered pigment such as xerographic toner on binder layer 16 and heat light filter 80 until the toner has diffused into the thermoplastic binder layer 16. This provides a thin layer 82 at back surface 19 of binder layer 16 having greater opacity than layer 16, the opacity of layer 82 being selected to reduce transmission through interstices 20 to acceptable levels.

Figure 9:
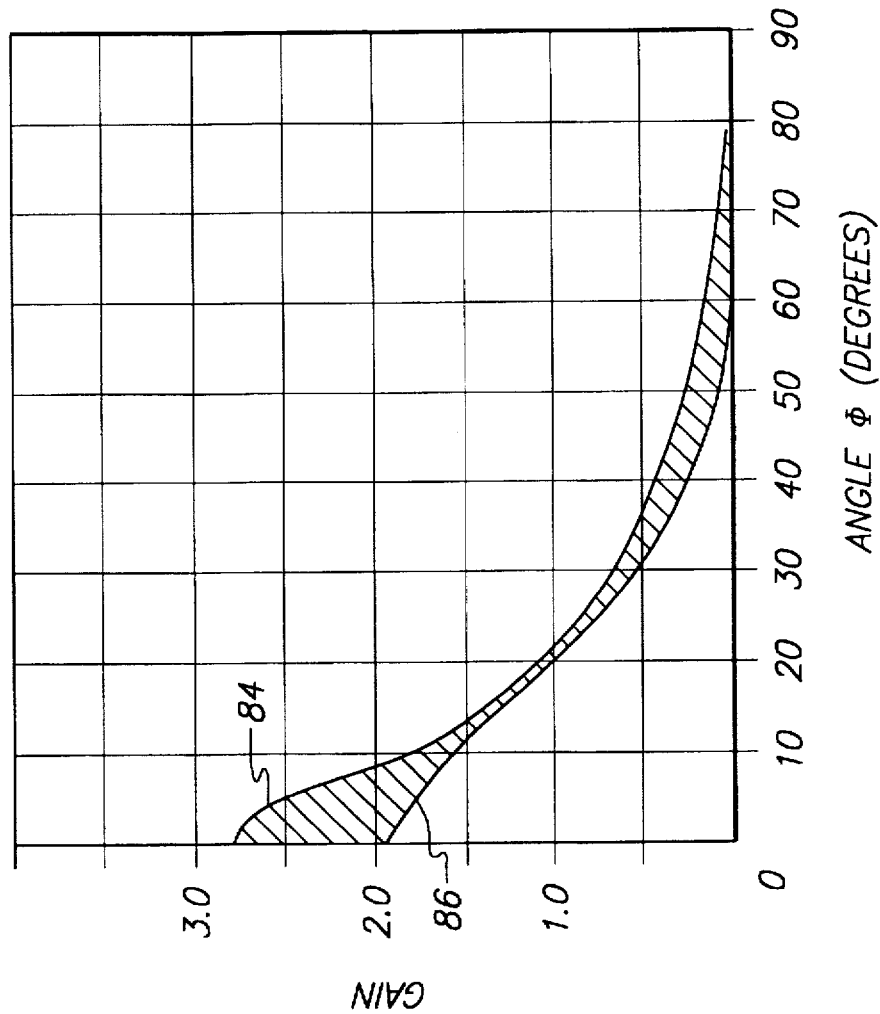
FIG. 9 is a gain profile for a basic refractive light filter and for a multi-layer light filter including a second opaque layer.

Referring now to FIG. 9, there are shown gain profiles 84, 86 for light filters 10, 80, respectively, having binder layers 16 with identical opacities. However, light filter 80 has additional high opacity layer 82, which is not present in light filter 10. Profile 84 of light filter 10 exhibits higher total light intensities for all angles, particularly near 0°. The greater light transmission of profile 84 relative to profile 86 indicates that significant amounts of interstitially transmitted light reaches filter surface 18 at the opacities typically selected for binder layer 16. The peak in this difference at 0° is consistent with the fact that light transmitted through interstices 20 is neither refracted nor dispersed, and consequently is transmitted predominantly parallel to normal 11 of filter surface 18. This forward peaking also indicates that light transmitted through interstices 20 will interfere most with images viewed at small angles from normal 11. The elimination of interstitially transmitted light in profile 86 means that images generated using light filter 80 will have superior contrast.

Figure 10B:
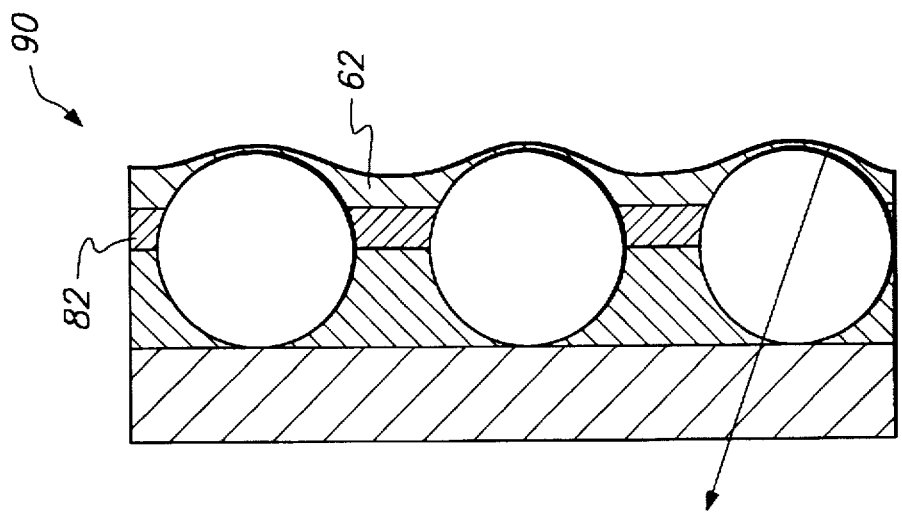
FIG. 10B is a schematic diagram of a light filter in accordance with the present invention in which a second opaque layer and a thin transparent resin layer have been added to the filter to enhance its gain control, ambient light rejection, and image contrast.
Figure 10A:
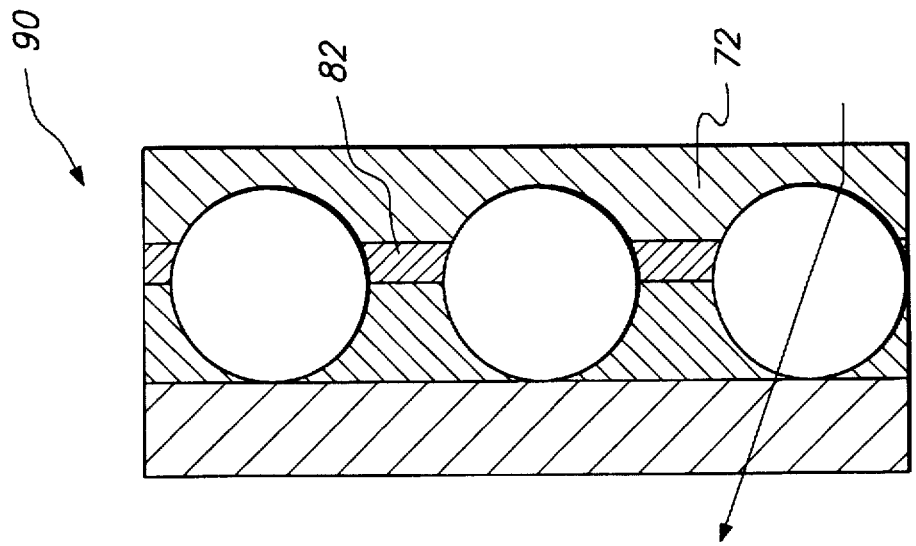
FIG. 10A is a schematic diagram of a light filter in accordance with the present invention in which a second opaque layer and a transparent resin layer have been added to the filter to enhance its gain control, ambient light rejection, and image contrast.

It is further noted that high opacity layer 82 may be combined with transparent resin layer 62 or resin layer 72 of light filters 50 and 70, respectively, to provide a light filter 90 having enhanced contrast, ambient light rejection, and gain control relative to basic refractive light filters 10. Referring now to FIG. 10A, there is shown a multi-layer light filter 90 having both high contrast opaque layer 82 and gain controlling, transparent layer 72. In FIG. 10B, there is shown a multi-layer light filter 90 in which tranparent layer 72 has been replaced with thin transparent layer 62.

Therefore, improved light filters are presented in accordance with the present invention, that use additional, optically active layers to provide improved control over the optical properties of the light filter. By adjusting the thickness and optical properties of these additional layers, high performance light filters 50, 70, 80, 90 can be produced in which gain control, ambient light rejection, and contrast are optimized.

What is claimed is:

1. A light filter, comprising:

a light transmitting material having a front surface and a back surface;

a light absorbing layer of material having a front surface and a back surface, wherein the back surface of the light transmitting material is affixed to the front surface of the light absorbing layer of material;

a plurality of beads of light transmitting material arranged in a single-layer array, the beads being supported in the light absorbing layer of material, perforating the front surface of the light absorbing layer of material, and protruding through the back surface of the light absorbing layer of material; and a layer of light transmitting material, having a selected thickness, affixed to the back surface of the light absorbing layer of material in interstices between the beads.

2. A light filter, comprising:

a light absorbing layer of material having a front surface and a back surface;

a plurality of beads of light transmitting material arranged in a single-layer array, the beads being supported in the light absorbing layer of material, perforating the front surface of the light absorbing layer of material, and protruding through the back surface of the light absorbing layer of material; and a layer of light transmitting material, having a selected thickness, affixed to the back surface of the light absorbing layer of material.

3. A light filter, comprising:

a light absorbing layer of material having a front surface and a back surface;

a plurality of beads of light transmitting material arranged in a single-layer array, the beads being supported in the light absorbing layer of material, perforating the front surface of the light absorbing layer of material, and protruding through the back surface of the light absorbing layer of material;

a second light absorbing layer of material having a front surface affixed to the back surface of the first light absorbing layer of material, and having a back surface through which the beads protrude; and a layer of light transmitting material, having a selected thickness, affixed to the back surface of the second light absorbing layer of material in interstices between the beads.

4. A light filter, comprising:

a light transmitting material having a front surface and a back surface;

a light absorbing layer of material having a front surface and a back surface, wherein the back surface of the light transmitting material is affixed to the front surface of the light absorbing layer of material;

a plurality of beads of light transmitting material arranged in a single-layer array, the beads being supported in the light absorbing layer of material, perforating the front surface of the light absorbing layer of material, and protruding through the back surface of the light absorbing layer of material;

a second light absorbing layer of material having a front surface affixed to the back surface of the first light absorbing layer of material, and having a back surface through which the beads protrude; and a layer of light transmitting material, having a selected thickness, affixed to the back surface of the second light absorbing layer of material.

5. A light filter, comprising:

a light transmitting material having a front surface and a back surface;

a light absorbing layer of material having a front surface and a back surface, wherein the back surface of the light transmitting material is affixed to the front surface of the light absorbing layer of material;

a plurality of beads of light transmitting material arranged in a single-layer array, the beads being supported in the light absorbing layer of material, perforating the front surface of the light absorbing layer of material, and protruding through the back surface of the light absorbing layer of material; and a second light absorbing layer of material having a front surface affixed to the back surface of the first light absorbing layer of material, and having a back surface through which the beads protrude.

6. A light filter, comprising:

a light absorbing layer of material having a front surface and a back surface;

a plurality of beads of light transmitting material arranged in a single-layer array, the beads being supported in the light absorbing layer of material, perforating the front surface of the light absorbing layer of material, and protruding through the back surface of the light absorbing layer of material; and a second light absorbing layer of material having a front surface affixed to the back surface of the first light absorbing layer of material, and having a back surface through which the beads protrude.

7. A light filter, comprising:

a light absorbing layer of material with a front surface and a back surface, wherein the material in the layer is highly transmissive near the front surface and lowly transmissive near the back surface; and a plurality of beads of light transmitting material arranged in a single-layer array, the beads partially embedded within and held together by the light absorbing layer of material so as to perforate the front surface and protrude through the back surface, for providing light transmitting channels through the light absorbing layer of material.

8. The light filter of claim 7, wherein:

the light absorbing layer of material includes a support sheet containing perforations, with the beads of light transmitting material bonded into the perforations of the support sheet for supporting the beads in the single-layer array.

9. The light filter of claim 8, wherein:

the support sheet comprises a mesh of spaced and intersecting fibers forming the perforations in the regions between the fibers.

10. The light filter of claim 8, wherein:

the support sheet comprises a metallic sheet containing perforations.

11. The light filter of claim 8, wherein:

the support sheet has a front face and a back face, and the perforations in the support sheet extend from the front face to the back face;

the beads of light transmitting material are affixed into the perforations of the support sheet at the back face creating depressions between the beads and the front face; and the depressions are filled with light transmitting material.

12. The light filter of claim 11, additionally comprising:

a layer of light transmitting material with a back face affixed to the front face of the support sheet; and wherein the light transmitting material filling the depressions comprises a non-solid material trapped between the beads, the support sheet, and the layer of light transmitting material.

13. The light filter of claim 7, wherein:

the light absorbing layer of material comprises a plurality of sheets having a front face and a back face, the sheets being stacked with the back face of one sheet in front of the front face of another sheet, and the sheets affixed together to form the layer.

14. The light filter of claim 13, wherein:

the plurality of sheets includes a sheet of light transmitting material for increasing the transmissivity of the light filter.

15. The light filter of claim 13, wherein:

the plurality of sheets includes at least one sheet of photosensitive film for varying the transmissivity of the light absorbing layer of material in response to exposure of the light filter to light.

16. A light filter, comprising:

a light absorbing layer of material with a front surface and a back surface;

a plurality of beads of light transmitting material arranged in a single-layer array, the beads partially embedded within and held together by the light absorbing layer of material so as to perforate the front surface and protrude through the back surface, for providing light transmitting channels through the light absorbing layer of material; and wherein at least one from the group of the light absorbing layer of material and the beads of light transmitting material includes a material of adjustable transmissivity for adjusting the transmissivity of the light filter.

17. The light filter of claim 16, wherein:

the material of adjustable transmissivity includes photochromic material for adjusting the transmissivity of the light filter in response to exposure of the light filter to light.

18. The light filter of claim 16, wherein:

the material of adjustable transmissivity includes an electro-optically active material for adjusting the transmissivity of the light filter in response to exposure of the light filter to an electric field.

19. A light filter, comprising:

a light absorbing layer of material with a front surface and a back surface;

a plurality of beads of light transmitting material arranged in a single-layer array, the beads partially embedded within and held together by the light absorbing layer of material so as to perforate the front surface and protrude through the back surface, for providing light transmitting channels through the light absorbing layer of material; and an additional layer of material of adjustable transmissivity bonded to at least one from the group of the front surface and the back surface of the light absorbing layer of material for adjusting the transmissivity of the light filter.

20. The light filter of claim 19, wherein:

the additional layer of material includes electro-optically active material for adjusting the transmissivity of the light filter in response to exposure of the light filter to an electric field.

21. The light filter of claim 19, wherein:

the additional layer of material includes photochromic material for adjusting the transmissivity of the light filter in response to exposure of the light filter to light.

22. A light filter comprising:

a light absorbing layer of material with a front surface and a back surface;

a plurality of beads of light transmitting material arranged in a single-layer array, the beads partially embedded within and held together by the light absorbing layer of material so as to perforate the front surface and protrude through the back surface, for providing light transmitting channels through the light absorbing layer of material; and a plurality of smaller beads of light transmitting material positioned between the beads in the single-layer array, for increasing the packing density of beads in the light filter.

23. A method of manufacturing a light filter of light transmissive beads and optical materials including light absorbing material and light transmitting material using a support surface for supporting the light filter during manufacture, the method comprising the steps of:

depositing the light absorbing material over the support surface for forming a layer of light absorbing material;

spreading the light transmissive beads over the deposited material and arranging the light transmissive beads in an array;

penetrating the light transmissive beads into the deposited material substantially to the support surface;

depositing and fusing a selected quantity of additional optical material onto the layer of light absorbing material, the optical material from the group of light transmitting material and light absorbing material; and removing the light filter including the light transmissive beads, layer of light absorbing material, and the additional optical material from the support surface.

24. The method of manufacturing a light filter of claim 23 additionally using a release agent for easing the removal of the light filter from the support surface, the method additionally comprising the step of:

coating the release agent over the support surface before depositing the light absorbing material over the support surface.

25. The method of manufacturing a light filter of claim 23 additionally including a light transmitting sheet as a front surface to the light filter, the method additionally comprising the steps of:

laying the light transmitting sheet over the support surface before depositing the light absorbing material over the support surface, the light transmitting sheet for forming the front surface of the light filter; and removing the light filter including the light transmissive beads, the layer of light absorbing material, the light transmitting sheet, and the additional optical material from the support surface.

26. The method of manufacturing a light filter of claim 23, wherein the light absorbing material deposited over the support surface comprises thermoplastic material having a viscous fluid state and a substantially rigid set state, and wherein:

the plastic is softened prior to penetration of the light transmissive beads and set after penetration of the light transmissive beads.

27. A method of manufacturing a light filter of light transmissive beads and light absorbing material, the method using a support surface and electrical charges for supporting and arranging the light transmissive beads during manufacture, and comprising the steps of:

selectively electrically charging the light transmissive beads;

depositing the light transmissive beads on the support surface;

allowing the selective electrical charges to position the light transmissive beads on the support surface in a close packed array;

binding the light transmissive beads together with the light absorbing material; and removing the light filter including the light transmissive beads and layer of light absorbing material from the support surface.

28. The method of manufacturing a light filter of claim 27 additionally including a light transmitting sheet as a front surface to the light filter, the method additionally comprising the steps of:

laying the light transmitting sheet over the support surface before selectively electrically charging the light transmissive beads; and removing the light filter including the light transmissive beads, the layer of light absorbing material, and the light transmitting sheet from the support surface.

29. A method of manufacturing a light filter of light transmissive beads and a layer of light absorbing material using a template containing indentations for holding the light transmissive beads in an array during an embedding process, the method comprising the steps of:

positioning light transmissive beads into the indentations in the template;

embedding into the layer of light absorbing material the array of beads being supported in position by the template; and removing the template, leaving the array of beads embedded in the layer of light absorbing material.

* * * * *